US008593775B2

(12) United States Patent
Gebhardt et al.

(10) Patent No.: US 8,593,775 B2
(45) Date of Patent: Nov. 26, 2013

(54) SURGE ARRESTER

(75) Inventors: Lutz Gebhardt, Reinach (CH); Daniel Egger, Zürich (CH); Daniel Neeser, Thalwil (CH); Dieter Schön, Klettgau (CH)

(73) Assignee: ABB Technology AG, Zürich (CH)

( * ) Notice: Subject to any disclaimer, the term of this patent is extended or adjusted under 35 U.S.C. 154(b) by 0 days.

(21) Appl. No.: 13/566,475

(22) Filed: Aug. 3, 2012

(65) Prior Publication Data

US 2012/0293905 A1 Nov. 22, 2012

Related U.S. Application Data

(63) Continuation of application No. PCT/EP2011/051655, filed on Feb. 4, 2011.

(30) Foreign Application Priority Data

Feb. 5, 2010 (EP) .................................... 10152777

(51) Int. Cl.
*H02H 1/00* (2006.01)

(52) U.S. Cl.
USPC .......................................... 361/118; 361/120

(58) Field of Classification Search
USPC .......................................... 361/118, 120, 127
See application file for complete search history.

(56) References Cited

U.S. PATENT DOCUMENTS

| | | | | |
|---|---|---|---|---|
| 4,930,039 | A | 5/1990 | Woodworth et al. | |
| 5,291,366 | A * | 3/1994 | Giese et al. | 361/127 |
| 5,517,382 | A | 5/1996 | Leupp et al. | |
| 5,896,266 | A | 4/1999 | Rubinski | |
| 6,396,676 | B1 | 5/2002 | Doone et al. | |
| 2005/0105238 | A1 * | 5/2005 | Schmidt et al. | 361/127 |

FOREIGN PATENT DOCUMENTS

| | | | |
|---|---|---|---|
| EP | EP 0 372 106 | A1 | 6/1990 |
| EP | 0 393 854 | A1 | 10/1990 |
| EP | EP 0 614 198 | A2 | 9/1994 |
| EP | 0 642 141 | A1 | 3/1995 |
| EP | EP 0 847 062 | A1 | 6/1998 |
| WO | WO 97/32382 | A1 | 9/1997 |
| WO | WO 98/38653 | A1 | 9/1998 |

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) dated Aug. 16, 2012, issued in corresponding International Application No. PCT/EP2011/051655. (13 pages).

(Continued)

*Primary Examiner* — Danny Nguyen
(74) *Attorney, Agent, or Firm* — Buchanan Ingersoll & Rooney PC

(57) ABSTRACT

A surge arrester includes an active part, two electrodes resting against the active part and a connecting element. The active part and the electrodes are arranged in the connecting element. The connecting element is produced in an injection molding method or die-casting method, in which the connecting element shrinks during its production. As a result, the electrodes are firmly pressed against the active part.

45 Claims, 4 Drawing Sheets

(56) References Cited

OTHER PUBLICATIONS

Notification of Transmittal of Translation of the International Preliminary Report on Patentability (Forms PCT/IB/336 and PCT/IB/373) and the Written Opinion of the International Searching Authority (Form PCT/ISA/237) dated Aug. 16, 2012, issued in corresponding International Application No. PCT/EP2011/051655. (16 pages).

International Search Report (PCT/ISA/210) issued on Apr. 28, 2011, by the European Patent Office as the International Searching Authority for International Application No. PCT/EP2011/051655.

Written Opinion (PCT/ISA/237) issued on Apr. 28, 2011, by the European Patent Office as the International Searching Authority for International Application No. PCT/EP2011/051655.

Search Report issued on Jun. 4, 2010, by the European Patent Office for Application No. 10152777.8

* cited by examiner

SURGE ARRESTER

RELATED APPLICATION(S)

This application is a continuation of International Application No. PCT/EP2011/051655 filed on Feb. 4, 2011 which claims priority under 35 U.S.C. §119 to European Patent Application No. 10152777.8 filed in Europe on Feb. 5, 2010, the entire contents of which are hereby incorporated by reference in their entirety.

FIELD

The present disclosure relates to the field of surge arresters. More particularly, the present disclosure relates to a modularly constructed arrester system and to a method for producing the surge arrester.

BACKGROUND INFORMATION

Surge arresters are known in the most varied embodiments. For example, EP-A-0 642 141 discloses a surge arrester. This known surge arrester has an active part for diverting overvoltage which, in particular, consists of varistor blocks. The active part or the varistor blocks, respectively, are inserted into a prefabricated frame of fiber-glass reinforced polyamide. The known frame has on its sides frame openings through which the diverting elements are inserted into the frame. After the insertion of the electrodes and of the varistor blocks into the frame, the varistor blocks and the electrodes are clamped firmly inside the frame by means of an electrically highly conductive clamping device by which means, on the one hand, the varistor blocks or the active part, respectively, is held firmly in the frame and, on the other hand, a contact pressure for contacting the varistor blocks with one another and/or for contacting the varistor block by means of one of the electrodes is built up. In EP-A-0 642 141, the clamping device, which can have a threaded pin guided in a screw, at the same time forms in each case a connecting electrode or a connecting fixture, respectively, or parts thereof for the surge arrester. In other words, the electrode is displaceable with respect to the frame for the purpose of contacting the varistor block, in such a manner that, by rotating the threaded pin, the electrode initially spaced apart from the varistor block is brought to rest against the varistor block and can be loaded with pressure. The frame with the varistor blocks inserted therein is completely sheathed by a jacket with shields. The jacket with the shields is also called a weather protection housing.

However, in this known surge arrester, a gap is formed between the frame and the varistor block. In the ideal case, this gap is filled by a silicone compound of the weather protection housing. Due to the thermal loading during the operation of the surge arrester and the permeability of silicone for water vapor, water can accumulate especially in this gap. Such accumulations of water can contribute to the failure of the surge arrester.

A further surge arrester is known from EP-A-0 614 198. In this surge arrester, the diverting elements are arranged between connecting fixtures which, in turn, are connected by means of loops. A contact electrode for contacting the varistor block and the varistor blocks are clamped to one another by means of a rotatable pressure screw held in one of the connecting fixtures. By this means, the contact pressure between the varistor blocks to one another and between the contact electrodes and the varistor blocks resting against them is also built up. Each of the loops is produced of wound, fiber-glass reinforced tapes which are embedded in a plastic matrix. The diverting elements and the loops are enclosed completely, and the connecting fixtures are enclosed at least partially, by a cast housing of insulating material provided with shields, which forms a weather protection housing.

A further surge arrester is known from EP-A-0 847 062. In this surge arrester, the clamping device is constructed by a tube of insulating material into which one of the fixtures is screwed at the end. Between the fixtures, a diverting element is again arranged. By screwing the fixture into the tube of insulating material, the fixtures, the tube of insulating material and the diverting element are firmly clamped to one another. Furthermore, this printed document shows that the tube of insulating material may be manufactured of a thermoplastic polymer and a filling material embedded therein such as, for example, glass fibers.

In a further embodiment disclosed in EP-A-0 847 062, of the surge arrester, the tube of insulating material is closed at its ends with lids of insulating material after the assembly of the diverting element and of the fixtures in the tube of insulating material. The same insulating material may be used for the lids and the closing may be performed by means of ultrasonics.

From EP-A-0 372 106, a surge arrester is known in which the diverting elements, heat absorption elements and connecting fixtures are inserted into a prefabricated tube of polyethylene. After the insertion of the diverting elements, heat absorption elements and connecting fixtures, the tube is shrunk by heating in such a manner that the diverting elements, heat absorption elements and connecting fixtures are firmly pressed against one another.

From EP-A-0 393 854, a surge arrester is known which has gas outlet openings in order to prevent any bursting apart in the case of a fault.

Further surge arresters are known from WO 97/32382. A first surge arrester known from WO 97/32382 has reinforcing strips which are embedded in a plastic matrix for reinforcement in the axial direction of the surge arrester.

Another surge arrester also disclosed in WO 97/32382 has a connecting element made of an insulating material which holds together electrodes and varistor blocks. The connecting element has a basic layer of a resin material. Furthermore, the connecting element has one or more outer layers which are also of resin material. Relatively short fiber bundles are mixed into the resin material of the outer layers.

Surge arresters which may be used in medium- and high-voltage grids are intended to meet the specifications of, among other things, the IEC 60099 standard. However, known surge arresters are susceptible to gas formation inside the active part under overload of the diverting element, that is to say if the active part with the varistor has absorbed too much energy due to too high a temporary overvoltage or too high a line discharge. If the gas cannot escape from the surge arrester, this leads to an explosion of the surge arrester. This represents a danger for the plant itself in which the surge arrester is arranged and for persons who are occupied in the immediate vicinity of the surge arrester.

SUMMARY

An exemplary embodiment of the present disclosure provides a surge arrester. The exemplary surge arrester includes an active part including at least one diverting element having at least a nominal voltage of 1 kV. The active part is constructed at least approximately cylindrically and extends along an axis. The exemplary surge arrester also includes two electrodes resting against the active part and being arranged opposite one another in the direction of the axis. In addition, the exemplary surge arrester includes a connecting element composed of an insulating material and pressing the electrodes firmly against the active part for electrically contacting the active part by means of the electrodes. The connecting element is configured to rest directly against the active part at least radially with respect to the axis. The connecting element is configured to press the electrodes against the active part in the direction of the axis due to shrinkage in the direction of the axis during the production of the connecting element. The connecting element has passage openings in an area between the two electrodes.

An exemplary embodiment of the present disclosure provides a method of producing a surge arrester. The exemplary method includes providing the surge arrester with an active part including at least one diverting element. The active part is constructed at least approximately cylindrically, extends along an axis and has two mutually spaced-apart contacting areas in the direction of the axis. The exemplary method also includes inserting the active part and two electrodes into a die. The active part and the electrodes are inserted such that a first electrode of the two electrodes rests against one contacting area and a second electrode of the two electrodes rests against another contacting area of the active part. In addition, the exemplary method includes injecting a material forming a connecting element around the active part and the electrodes. The exemplary method also includes molding passage openings into the connecting element during sheathing. Furthermore, the exemplary method includes shrinking the material for forming the connecting element in the direction of the axis during at least one of cooling and curing in the die, to press the electrodes against the active part.

An exemplary embodiment of the present disclosure provides a method of producing a surge arrester. The exemplary method includes providing the surge arrester with an active part including at least one diverting element. The active part is constructed at least approximately cylindrically, extends along an axis and has two mutually spaced-apart contacting areas in the direction of the axis. The exemplary method also includes inserting a material into a die for forming a connecting element for firmly pressing the electrodes against the active part for electrically contacting the active part by means of the electrodes. The exemplary method includes inserting the active part and the two electrodes into the die, the active part and the electrodes being inserted so that a first electrode of the two electrodes rests against one contacting area and a second electrode of the two electrodes rests against another contacting area of the active part. In addition, the exemplary method includes pressing the active part, the electrodes and the material to form the connecting element from the material. Furthermore, the exemplary method includes molding passage openings into the connecting element during the pressing, and shrinking the material to form the connecting element in the direction of the axis during at least one of cooling and curing in the die to press the electrodes against the active part.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
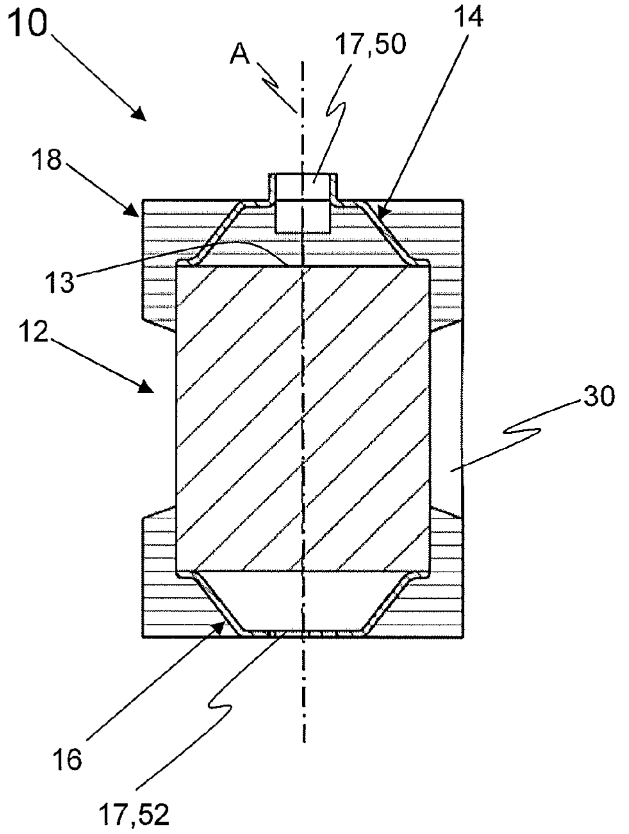
FIG. 1 shows in a sectional representation a surge arrester including electrodes which are pluggable, according to an exemplary embodiment of the present disclosure.

Exemplary embodiments of the present disclosure provide an arrester which can be manufactured cost-effectively, is reliable in operation and meets the specifications of the relevant safety standards.

Exemplary embodiments of the present disclosure provide a surge arrester, a modularly constructed arrester system, a method for producing a surge arrester.

In accordance with an exemplary embodiment, a surge arrester according to the present disclosure includes an active part, two electrodes resting against the active part, and a connecting element of an insulating material in which the active part and the electrodes are arranged. According to an exemplary embodiment of the present disclosure, the connecting element shrinks during its production. Due to the shrinkage of the connecting element during the cooling and/or curing, the electrodes are firmly pressed against the active part which produces good electrical contact between the respective electrode and the active part. Furthermore, the shrinkage makes it possible to ensure that the connecting element rests directly against the active part as a result of which no contamination such as, for example, water, can penetrate between the connecting element and the active part during the operation of the surge arrester. This increases the reliability of the surge arrester. Furthermore, the connecting element rests radially directly against the active part which improves the mechanical characteristics of the surge arrester with respect to known designs, for example, with respect to shearing forces. In addition, the low number of individual parts provides for a cost-effective production.

Furthermore, the design of the connecting element can be optimized for strength since after its production, no further elements are to be inserted into the connecting element as is the case partially in known designs, such as, for example, EP-A-0 642 141. As a result, the mechanical strength of the connecting element can be optimized and the expenditure of material for the connecting element can be minimized. Therefore, costs can be lowered while adhering to the relevant safety specifications and standards. Furthermore, the surge arrester according to the present disclosure can be manufactured more simply since no special clamping elements such as screws and threaded pins—as used in known designs—are for producing the contact pressure between electrodes and active part.

According to an exemplary embodiment of the present disclosure, the connecting element is constructed by means of direct casting around the electrodes and the active part. This allows a cost-effective production method to be implemented. Furthermore, the direct casting enables the connecting element to be constructed resting directly around the active part without intermediate spaces. This means that no hollow spaces occur particularly in the radial direction between the active part and the connecting element. As a result, the surge arrester provides characteristics such as no moisture or water, respectfully, can accumulate between the active part and the connecting element during the operating period of the surge arrester as a result.

According to an exemplary embodiment of the present disclosure, the connecting element has a homogeneous structure and a homogeneous material structure. This structure of the connecting element enables it to be manufactured completely by means of an injection molding method. In consequence, the surge arrester can be manufactured extremely cost-effectively since it can be produced largely completely automatically.

According to an exemplary embodiment of the present disclosure, the surge arrester has no reinforcement connecting the electrodes to one another. Inserting a reinforcement would require a further manufacturing step before the injection or insertion of the material, respectively, into the die for producing the connecting element. This additional manufacturing step can be automated extremely poorly—if at all. In consequence, the surge arrester can be manufactured much more cost-effectively by omitting reinforcements, in comparison with known designs.

According to an exemplary embodiment of the present disclosure, the connecting element encloses the active part and the electrodes both radially and axially with respect to the axis. Due to the axial enclosure, the electrodes are held positively inside the connecting element. This prevents, for example, axial expulsion of the electrodes in the case of a fault.

Additional features of the exemplary embodiments are described in more detail below with reference to the drawings.

The reference symbols used in the drawing, and their significance are listed in summary in the list of reference symbols. In principle, identical parts are provided with identical reference symbols in the figures. The embodiments described serve as examples for the subject matter of the disclosure and do not have any restrictive effect.

FIG. 1 shows a surge arrester 10 according to an exemplary embodiment of the present disclosure. The surge arrester 10 has essentially the following elements: an active part 12, two electrodes 14, 16 and a connecting element 18, which is manufactured of an insulating material, and which connects the active part 12 and the electrodes 14, 16 to one another.

The active part 12 has at least one resistor which is nonlinear with respect to the current/voltage ratio, for example, a nonlinear resistor based on zinc oxide (ZnO). Such nonlinear resistors are also called varistors. The active part 12 essentially has the form of a straight circular cylinder with an axis A. Each of the two end faces of the circular cylinder are constructed as a contact area 13 for electrically contacting the active part 12 by means of one of the two electrodes 14, 16. In principle, other forms are also possible for the active part 12, such as a hollow cylinder form, for example. The axis A of the circular cylinder or of the active part 12, respectively, lies on an axis A of the surge arrester 10.

The surge arrester 10 according to the present disclosure meets the specifications of the IEC 60099 standard. For example, the surge arrester 10 has at least a nominal voltage of 1 kV (one kilovolt). As a result, the active part 12 blocks if a voltage of less than the nominal voltage is present at the active part 12. In the case of a voltage which is greater than the nominal voltage, the active part 12 is conductive. As a result, voltages which are greater than the nominal voltage, which are also called overvoltages, are diverted by the surge arrester 10.

On one side of the active part 12, the first electrode 14 of the two electrodes 14, 16 rests against the active part 12 in the direction of the axis A. On the side of the active part 12 opposite to the first electrode 14, the second electrode 16 rests against the diverting element 12. Therefore, the first electrode is arranged on one side of the active part 12 in the direction of the axis A and the second electrode 16 is arranged on the other side, the second electrode 16 being opposite the first electrode 14 with respect to the active part 12 in the direction of the axis A. In accordance with an exemplary embodiment, the electrodes 14, 16 are additionally mounted on the active part 12 by means of an electrically conductive adhesive.

The two electrodes 14, 16—the first electrode 14 and the second electrode 16—in each case have a contact area which is intended for resting against the respective contact area 13 of the active part 12. Furthermore, the two electrodes 14, 16 have in each case a connecting and contacting area 17.

The connecting element 18 is constructed around the active part 12 and the two electrodes 14, 16. The connecting element 18 is injected around the active part 12 and around the two electrodes 14, 16, for example in an injection molding method. This method is an example of a direct casting. As a result, the connecting element 18 encloses the active part 12 and the two electrodes 14, 16. For example, the connecting element 18 rests directly against the active part 12 radially with respect to the axis A. Due to the fact that the connecting element 18 contracts in the direction of the axis A due to shrinkage during cooling and/or curing, a pressure is applied to each of the two electrodes 14, 16 with respect to the active part 12 so that a good electrical connection is established between each of the two electrodes 14, 16 and the active part 12. Therefore, an internal tension can be built up in the connecting element 18 due to the production of the connecting element 18 by injection around the active part 12 and the two electrodes 14, 16, which tension clamps the electrodes 14, 16 against the active part 12. As a result, the connecting element 18 presses the two electrodes 14, 16 against the active part in the direction of the axis A, the tension in the connecting element 18 for pressing the electrodes 14, 16 against the active part 12 being built up by the production process.

By manufacturing the connecting element 18 by means of sheathing the active part and the two electrodes 14, 16, a separate element or device, respectively, for building up the mechanical tension for clamping the active part 12 to the electrodes 14, 16 can be omitted in contrast to known designs. Furthermore, a special work step for building up this tension can be omitted. In other words, the first electrode 14 and the second electrode 16 are arranged to be stationary with respect to the connecting element 18.

Manufacturing the connecting element 18 in the injection molding process and manufacturing the connecting element 18 by sheathing the active part 12 and the two electrodes 14, 16 makes it possible to construct the connecting element 18 with beneficial mechanical properties with little expenditure of material. Furthermore, the production process can be largely automated due to the extremely simple structure of the surge arrester 10 of active part 12, electrodes 14, 16 and connecting element 18 which makes it possible to lower the production costs. Automating the production process is made possible, for example, due to the fact that a separate element or device for building up the tension for clamping the active part 12 to the electrodes 14, 16 is omitted. Furthermore, a special work step for building up the tension can be omitted since the mechanical clamping of active part 12 and the two electrodes 14, 16 takes place by cooling and/or curing the connecting element 18.

In an area adjoining a jacket area of the active part 12, that is to say in the direction of the axis A between the two electrodes 14, 16, the connecting element 18 has passage openings 30. These passage openings 30 are used for removing any gas, which may form in the case of a fault of the active part 12, in the interior of the connecting element without the connecting element 18 being destroyed explosively as a result. The passage openings 30 prevent, for example, an explosive destruction of the surge arrester 10 in the case of a fault.

The passage openings 30 are formed during the construction of the connecting element 18.

As a result, the passage openings 30 form gas outlet openings through which gas which can form inside the connecting element in the case of a fault, can flow off. Therefore, by constructing the passage openings 30 in the area of the connecting element 18 which adjoins the jacket area of the active part 12, gas which may form in the area of the active part 12 can flow off radially outwardly with respect to the axis A.

In accordance with an exemplary embodiment, the connecting element 18 has at least two and/or at most twenty passage openings 30. In accordance with an exemplary embodiment, the connecting element 18 may have at least three and at most ten passage openings 30, for example, at least three and at most five passage openings 30.

The clear cross sectional areas of the passage openings 30 are constructed at least essentially identical to one another. Furthermore, the passage openings 30 are constructed at regular distances from one another in the peripheral direction with respect to the axis A at the connecting element 18. As a result, the connecting element 18 has a cage-like structure. The production process makes it possible that the connecting element 18 having this structure can be produced of one piece or manufactured integrally, respectively.

The cage-like structure is characterized by the fact that the active part 12 cannot escape through the passage openings 30. As a result, an expulsion of the active part 12 or parts or large fragments thereof out of the connecting element 18 can be advantageously prevented. Therefore, the cage-like structure contributes directly to safety in the case of a fault. If the active part 12 is loaded due to too high an overvoltage in the case of a fault, this can lead to the formation of gas and/or to fragmentation of the active part 12. Fragments can be expelled by the gases produced. The connecting element 18 of the surge arrester 10 according to the present disclosure effectively prevents fragments from being expelled.

The cage-like structure is also characterized by the electrodes 14, 16 being held positively within the connecting element 18 in the direction of the axis A and also in the radial direction thereto.

In other words, the connecting element 18 encloses the active part 12 and the electrodes 14, 16 radially and axially with respect to the axis A.

As shown in the drawings, the connecting element 18 encloses the active part 12 and the electrodes 14, 16 completely except in the connecting and contacting area 17 in the direction of the axis A. As stated, the connecting element 18 has passage openings 30 in the peripheral direction.

As a result, the cage-like structure prevents the electrodes 14, 16 from being expelled out of the connecting element 18 in the case of a fault, for example, in the direction of the axis A.

In accordance with an exemplary embodiment, the connecting and contacting area 17 of the respective electrode 14, 16 protrudes only or, respectively, at most out of the connecting element 18 in the direction of the axis A.

If the connecting element 18 has, for example, an even number of passage openings 30, the passage openings can also have different clear diameters, attention having to be paid in this case to a regular construction in the peripheral direction. For example, a passage opening having a smaller clear diameter can follow a passage opening having a larger clear diameter, the passage opening having the smaller clear diameter again being followed by a passage opening having the larger clear diameter. Other sequences, for example including three different clear diameters, are also conceivable. By choosing the number of passage openings and by choosing the shape of the passage openings, the mechanical stability of the connecting element 18 can be optimized with respect to the mechanical clamping of active part 12 and the two electrodes 14, 16 on the one hand, and the mechanical requirements of the connecting element 18 in the case of a fault. In the case of a fault, the mechanical requirements for the connecting element 18 are characterized, for example, in that, if at all, gas must escape from the interior of the connecting element 18 but no large fragments may be expelled from the interior of the connecting element 18.

In accordance with a total area, that is to say the accumulated area content of the passage openings 30 is between 20% and 90%, for example, between 30% and 80%, such as between 40% and 70% of the jacket area of the active part 12. The jacket area of the active part 12 is the part of the surface of the active part 12 which is located between the two contact areas 13 against which one of the two electrodes 14, 16 rests in each case, in the direction of the axis A.

As an alternative, the total area of the passage openings 30 can be at least 33% of the jacket area of the active part 12.

In accordance with an exemplary embodiment, the passage openings 30 have at least approximately an elliptical shape, the longer one of the two axes of the ellipse extending in the direction of the axis A. This has the result that the connecting element 18 has good mechanical characteristics.

So that the connecting element 18 can be manufactured completely by means of an injection molding method, a material which is suitable for injection molding is used for the connecting element 18. These are, for example, homogeneous materials. Homogeneous materials also include macroscopically homogeneous mixtures of materials as, for example, listed in the text which follows. As a result, the connecting element 18 produced completely by injection molding itself also has an at least macroscopically homogeneous structure and an at least macroscopically homogeneous material structure.

For example, the structure of the connecting element 18 does not have any different and/or does not have a plurality of layers. Furthermore, no reinforcements such as, for example, tapes or the like are inserted or embedded in the connecting element which connect the two electrodes with one another. Such reinforcements would lead to an inhomogeneous structure of the connecting element and make the complete production of the connecting element by means of injection molding impossible since the reinforcements must be inserted into the injection molding die before the material is injected into it. Therefore, the electrodes 14, 16 are connected to one another only via the connecting element 18 produced completely by means of injection molding.

In accordance with an exemplary embodiment, the connecting element 18 is produced of a thermosetting material. This can contain non-extensible fibers or also spheres as filling material. Furthermore, further additives can be contained in the connecting element 18. Glass fiber, basalt fibers and aramid fibers, for example, are conceivable as fibers. The fiber length must be suitable for the injection molding method or the die-casting method.

As an alternative, the connecting element 18 can also be manufactured of a plastic. In general, the material used for the connecting element 18 can satisfy the condition that the material does not or respectively almost does not creep since otherwise the contact pressure between the electrodes 14, 16 and the active part 12 decreases over the operating time. Furthermore, the material should crosslink. Material should also be electrically insulating. As well, filling materials, additives and/or fibers can be mixed in with the plastic as stated above.

In accordance with an exemplary embodiment, the two electrodes 14, 16 may be made of an electrically highly conductive sheet metal such as, for example, aluminum, steel, bronze or copper or their alloys and have a sheet thickness of, for example, 0.1 mm to 6 mm. For example, the sheet thickness can be from 0.5 mm to 4 mm, such as 1 mm to 3 mm.

As shown in FIG. 1, the connecting and contacting area 17 of the two electrodes 14, 16 can be constructed differently. The connecting and contacting area 17 of the first electrode 14 of the two electrodes 14, 16 is intended to act together with a connecting fixture or, as described in conjunction with FIG. 9, with the second electrode 16 of a further surge arrester 10'. In accordance with an exemplary embodiment, the surge arrester 10 and the further surge arrester 10' may be constructed to be largely identical, but can have, for example, an active part 12 for different nominal voltages. In order to act together with the second electrode 16 of the further surge arrester 10', the first electrode 14 has a pin extension 50 which is intended for acting together with a mounting hole 52 of the second electrode 16. Due to the fact that the surge arrester 10 has, on the one hand, the first electrode 14 with the pin extension 50 and, on the other hand, the second electrode 16 with the mounting hole 52, a plurality of surge arresters 10 can be concatenated, the pin extension 50 and the mounting hole 52 being matched to one another in such a manner that a mechanically strong and electrically highly conductive connection is produced by inserting the pin extension 50 into the mounting hole 52.

If the surge arrester 10 is provided with connecting fixtures, the connecting and contacting area 17 of the first electrode 14 and/or of the second electrode 16 can also be constructed differently. Furthermore, the connecting and contacting area 17 of the first and/or of the second electrode 14, 16 can also be constructed as a connecting fixture.

Figure 2:
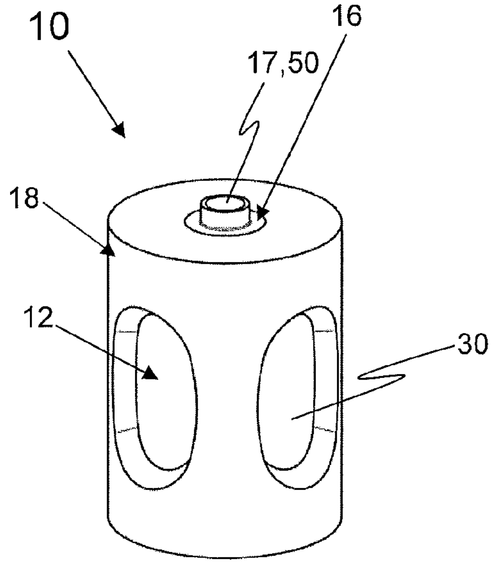
FIG. 2 shows the surge arrester according to FIG. 1 in a perspective view.
Figure 4:
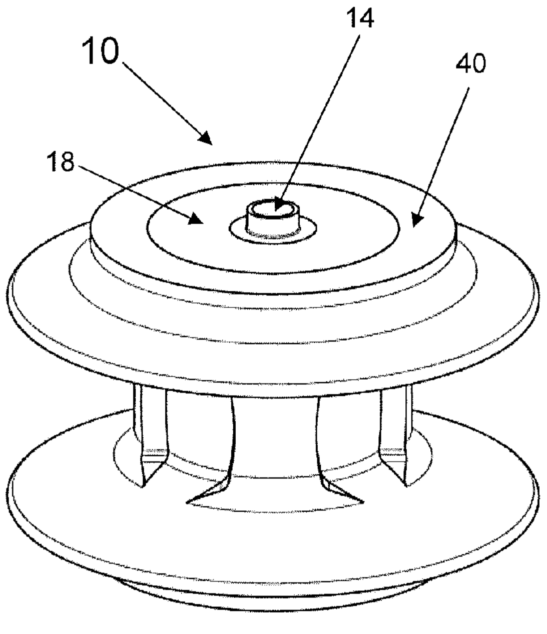
FIG. 4 shows the surge arrester according to FIG. 3 in a perspective view.
Figure 5:
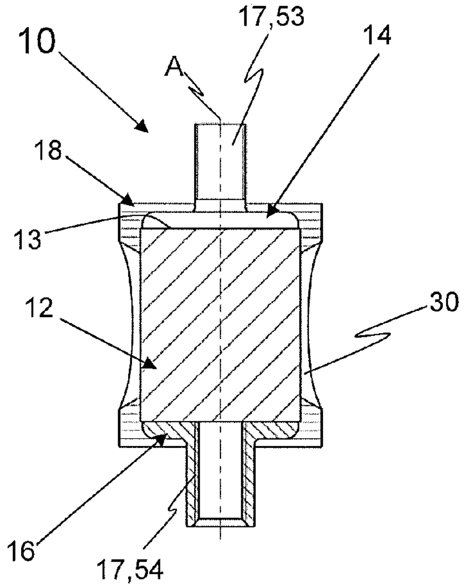
FIGS. 5 and 6 show in sectional representation exemplary embodiments of surge arresters including electrodes which are screwable.
Figure 6:
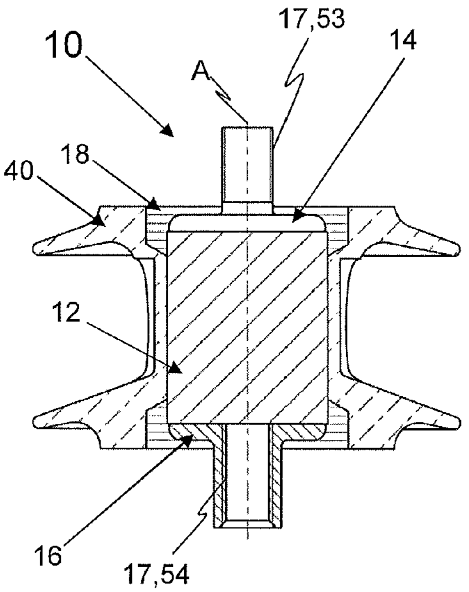
Figure 7:
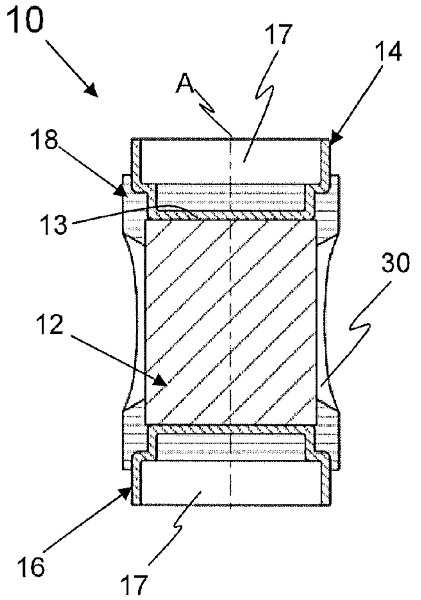
FIGS. 7 and 8 show in a sectional view exemplary embodiments of surge arresters including electrodes which are weldable.
Figure 8:
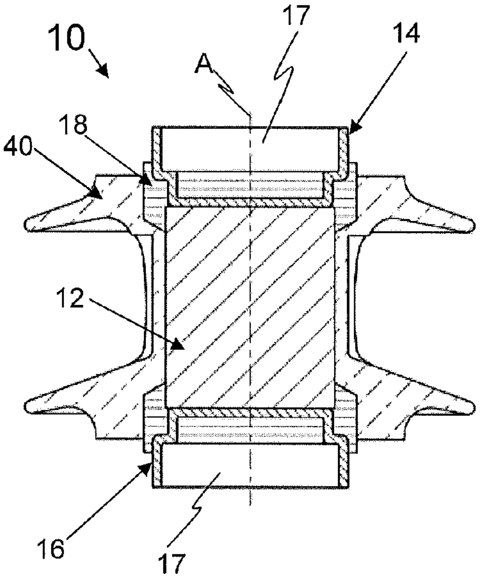

Further embodiments of the two electrodes 14, 16 are shown in FIGS. 5 to 8, where FIGS. 5 and 7 in each case show an exemplary embodiment which is largely constructed to be identical as the exemplary embodiment shown in FIGS. 1 and 2, but having differently constructed electrodes 14, 16. FIGS. 6 and 8 in each case show an exemplary embodiment which is largely constructed identically as the exemplary embodiment shown in FIGS. 3 and 4, but having differently constructed electrodes 14, 16.

The electrodes 14, 16 shown in FIGS. 5 and 6 are constructed in such a manner that the electrodes 14, 16 can be screwed together. For this purpose, the first electrode 14 has in the connecting and contacting area 17 a screw thread arranged radially on the outside. The second electrode 16 has in the connecting and contacting area 17 a screw thread located radially on the inside which is intended for being screwed onto the screw thread of the first electrode 14 or onto a correspondingly identically constructed screw thread.

The electrodes 14, 16 shown in FIGS. 7 and 8 are constructed in such a manner that the electrodes 14, 16 can be welded together. The electrodes 14, 16 can be constructed to be identical in this case.

The arrester 10 shown in FIGS. 1 and 12 is produced as follows.

The active part 12 and the two electrodes 14, 16 are inserted into a die, for example, an injection molding die, the first electrode 14 and the second electrode 16 in each case resting with their contact area against one of the two contact areas 13 of the active part 12. By means of one or two sliders of the injection molding die, displaceable in the direction of the axis A of the active part 12, the first electrode 14 and the second electrode 16 may be pressed firmly against the active part 12. By means of the further radial slider displaceable radially with respect to the axis A, the die is designed in such a manner that after the injection, the connecting element 18 results as described in conjunction with FIGS. 1 and 2. For example, the radial sliders are pressed radially against the active part 12. The radial sliders are used for forming the passage openings 30 in the connecting element 18. Following this, the material for producing the connecting element 18 is injected into the die. During the cooling and/or curing of this material, it shrinks, especially in the direction of the axis A, as a result of which a tension is built up in the connecting element 18 which firmly presses the two electrodes 14, 16 against the active part 12. This tension ensures an adequate contact pressure for electrically contacting the active part 12 by the two electrodes 14, 16.

As an alternative to producing the connecting element 18 by means of injection molding, the connecting element 18 can also be produced by a die-casting method. In such a method, the material for producing the connecting element 18 is provided, for example, in the form of mats or the like. The material is inserted into a die, for example, a compression die. The die has indentations which correspond to the negative die of the connecting element 18. After the insertion of the material, the active part 12 and the two electrodes 14, 16 are inserted into the die. After the insertion of the material, the electrodes 14, 16 and the active part 12, the die is closed. The connecting element 18 is produced from the material by heat and pressure, the material curing and shrinking analogously to the injection molding method. As a result, the electrodes 14, 16 are pressed against the active part analogously to the production method by means of injection molding. This die-casting method is a further example of direct casting.

In accordance with an exemplary embodiment, the active part 12 can have further elements such as metal blocks in addition to the varistor. As an alternative, the active part can also be formed only by a metal block or a plurality of metal blocks. Similarly, the active part 12 can have a plurality of varistors. Metal blocks can be used for removing heat from the varistor and/or enlarging the creepage path between the connecting fixtures of the surge arrester.

Furthermore, the varistor and/or the other elements can be sheathed or wrapped with a non-conductive material. A material for sheathing can be, for example, a glass fiber, aramid fiber or basalt fiber. Instead of fibers, tapes can also be used.

Figure 3:
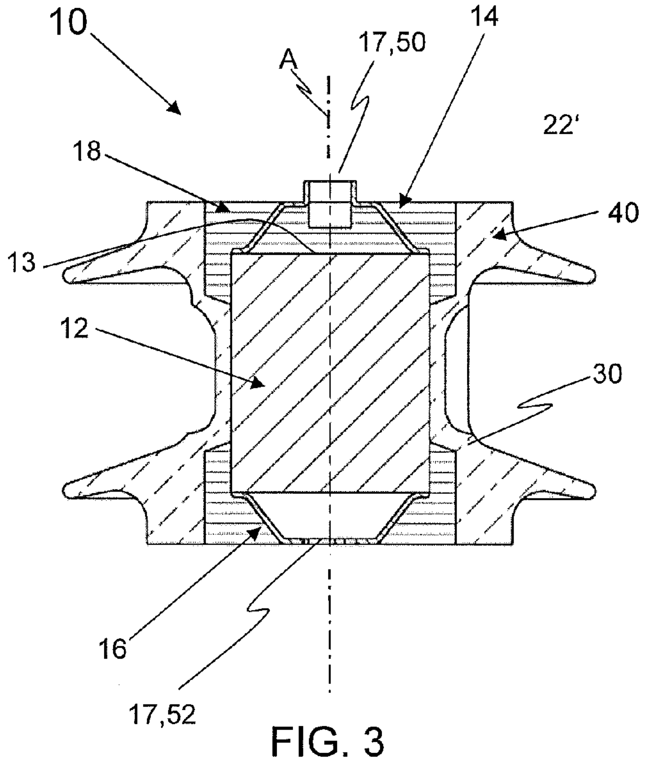
FIG. 3 shows in a sectional representation a surge arrester electrodes which are pluggable, according to an exemplary embodiment of the present disclosure.

FIGS. 3 and 4 show an exemplary embodiment of the surge arrester 10 according to the present disclosure. The surge arrester 10 shown in FIGS. 3 and 4 is constructed largely identically to the surge arrester 10 described in conjunction with FIGS. 1 and 2. In addition, the surge arrester 10 according to the exemplary embodiment of FIGS. 3 and 4 has a housing or weather protection housing 40, respectively.

In accordance with an exemplary embodiment, the housing 40 may be made of silicone and enclose the connecting element 18 with the active part 12 completely in the peripheral direction. In the direction of the axis 10, the housing 40 extends over the full constructional height of the surge arrester 10. The housing 40 has shields 42 in the direction of the axis A in the area of the first electrode 14 and of the second electrode 16. In the area of the passage openings 30, the housing 40 has a wall thickness which is selected in such a manner that in the case of a fault, gas can escape at least almost unimpeded from the connecting element 18 through the passage openings 30. During the escaping of the gas, the housing or weather protection housing 40 can be damaged, for example by the housing 40 being torn open in the area which adjoins the passage openings 30 of the connecting element 18 so that the gas can escape at least almost unimpeded.

If the surge arrester 10 is designed for interior applications, the housing 40 can also be produced without shields 42.

The housing 40 can have—except in the area of the shields 42, if at all—an at least almost approximately uniform wall thickness of, for example, between 1 mm and 10 mm, such as between 1 mm and 6 mm and between 2 mm and 3 mm. As a result, the passage openings formed in the connecting element 18 are also apparent at the housing 40. The at least approximately uniform wall thickness—except in the area of the shields 42, if at all—enables gas to emerge without problems in the case of a fault.

The surge arrester 10 shown in FIGS. 3 and 4 is produced largely identically to the surge arrester shown in conjunction with FIGS. 1 and 2. In a further process step, the housing 40 is injected around the connecting element 18 with the electrodes 14, 16 and the active part 12. As an alternative, the housing can also be prefabricated and pushed onto the connecting element 18 with the electrodes 14, 16 and the active part 12.

Figure 9:
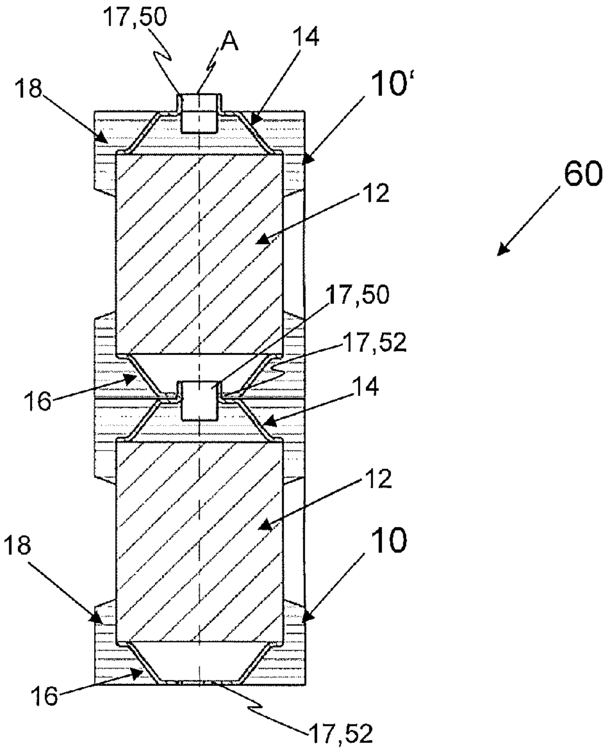
FIG. 9 shows in a sectional view an exemplary embodiment of a modularly constructed diverter system which is constructed of surge arresters according to FIGS. 1 and 2.
Figure 10:
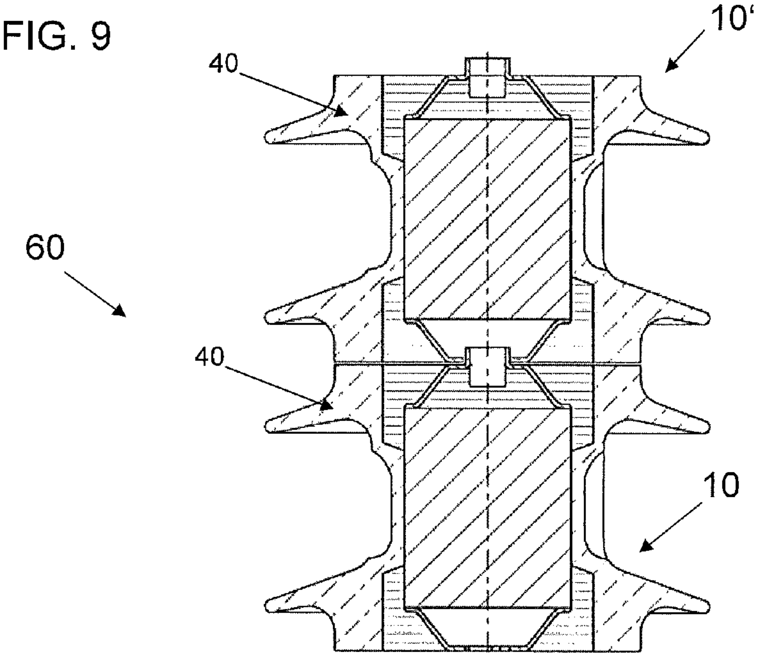
FIG. 10 shows in a sectional view an exemplary embodiment of a modularly constructed diverter system which is constructed of surge arresters according to FIGS. 3 and 4.

FIGS. 9 and 10 show a modularly constructed arrester system 60 according to an exemplary embodiment of the present disclosure. These arrester systems 60 are constructed modularly of the surge arrester 10 described in conjunction with FIGS. 1 and 8. In order to produce the arrester system 60 in modular construction from surge arrester 10, prefabricated surge arresters 10 are concatenated in the direction of the axis A as shown in FIG. 1, 2, 3, 4, 5, 6, 7 or 8 and electrically and mechanically connected to one another via the electrodes 14, 16. In accordance with an exemplary embodiment, the connection is made in the area of the immediately successive electrodes of two surge arresters 10 adjacent in the direction A, for example by pressing the pin extension 50 shown in FIGS. 1-4 into the correspondingly molded mounting hole 52 of the second electrode 16 also shown in FIGS. 1-4. As an alternative, for example, the outside thread 53 of the first electrode 14, shown in FIGS. 5 and 6, can be screwed into the inside thread 54 of the second electrode 16, also shown in FIGS. 5 and 6. As a further alternative, welding of the electrodes as shown in FIGS. 7 and 8 shall also be mentioned. Further exemplary embodiment for connecting the electrodes 14, 16 are well-known to the expert.

As shown in FIG. 10, the housing 40 can be arranged at each individual surge arrester 10. As an alternative, the housing 40, constructed of two parts in FIG. 10, can also be constructed integrally. In this case, the modularly constructed arrester system 60 is produced as follows. A plurality of surge arresters, as shown in FIGS. 1 and 2, are connected mechanically and electrically to one another at the electrodes 14, 16. Following this, the housing 40 is formed over the entire length in the direction of the axis A of the arrester system 60, for example by pushing on a prefabricated housing 40.

The active part 12 used in the surge arresters 10 can be constructed, for example, for a nominal voltage of 4 kV (kilovolt) or 6 kV. As a result, the arrester system 60 can be constructed from the surge arresters 10 with nominal voltages in steps of 4 kV or 6 kV. For example, an arrester system 60 for a nominal voltage of 10 kV can be implemented by assembling a surge arrester 10 having a nominal voltage of 4 kV and a surge arrester 10 having a nominal voltage of 6 kV. In consequence, arrester systems 60 for nominal voltages of, for example 8 kV, 10 kV, 12 kV, 14 kV, 16 kV etc. can be implemented from the surge arresters 10. Naturally, the nominal voltages of the surge arresters are not restricted to 4 kV and 6 kV but other nominal voltages can also be selected. As a result, the arrester system 60 can be built up modularly in arbitrary steps of, for example, 1 kV, 2 kV, 3 kV or also 0.5 kV or 10 kV.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

10, 10' Surge arrester
12 Active part
13 Contact areas
14 First electrode
16 Second electrode
17 Connecting and contacting area
18 Connecting element
30 Passage opening
40 Housing, weather protection housing
42 Shield
50 Pin extension
52 Mounting hole
53 Outside thread
54 Inside thread
60 Arrester system
A Axis

What is claimed is:

1. A surge arrester comprising:

an active part including at least one diverting element having at least a nominal voltage of 1 kV, the active part being constructed at least approximately cylindrically and extending along an axis;

two electrodes resting against the active part and being arranged opposite one another in the direction of the axis; and a connecting element comprised of an insulating material and pressing the electrodes firmly against the active part for electrically contacting the active part by means of the electrodes, wherein:

the connecting element is configured to rest directly against the active part at least radially with respect to the axis;

the connecting element is configured to press the electrodes against the active part in the direction of the axis due to shrinkage in the direction of the axis during the production of the connecting element; and the connecting element has passage openings in an area between the two electrodes.

2. The surge arrester as claimed in claim 1, wherein the connecting element is constructed by means of direct casting around the electrodes and the active part.

3. The surge arrester as claimed in claim 1, wherein the connecting element has a macroscopically homogenous structure and a macroscopically homogenous material structure.

4. The surge arrester as claimed in claim 1, wherein the surge arrester has no reinforcement connecting the electrodes to one another.

5. The surge arrester as claimed in claim 1, wherein the connecting element encloses the active part and the electrodes radially and axially with respect to the axis.

6. The surge arrester as claimed in claim 1, wherein the surge arrester has no further device for pressing the electrodes against the active part.

7. The surge arrester as claimed in claim 1, wherein the connecting element is made in one of an injection molding method and a die-casting method.

8. The surge arrester as claimed in claim 1, wherein the passage openings are gas outlet openings through which gas which is formable inside the connecting element can flow off radially outwardly.

9. The surge arrester as claimed in claim 1, wherein the connecting element has between 2 and 20 passage openings in a peripheral direction with respect to the axis.

10. The surge arrester as claimed in claim 1, wherein a total area of the passage openings is between 20% and 90% of a jacket area of the active part.

11. The surge arrester as claimed in claim 1, wherein the passage openings have at least approximately an elliptical shape, the longer one of two axes of the ellipse extending in the direction of the axis of the active part.

12. The surge arrester as claimed in claim 1, wherein the connecting element is made of an almost non-creeping and electrically insulating plastic.

13. The surge arrester as claimed in claim 1, wherein the connecting element is constructed to be produced integrally.

14. The surge arrester as claimed in claim 1, wherein the connecting element encloses the active part and the two electrodes.

15. The surge arrester as claimed in claim 1, wherein the electrodes are made of electrically conductive sheet metal.

16. The surge arrester as claimed in claim 15, wherein the sheet metal has a thickness of 0.1 mm to 6 mm.

17. The surge arrester as claimed in claim 1, wherein the electrodes are arranged to be stationary with respect to the connecting element.

18. The surge arrester as claimed in claim 1, wherein the electrodes are constructed as connecting fixtures or connecting electrodes.

19. The surge arrester as claimed in claim 1, wherein the connecting element with the active part arranged therein is enclosed by a housing, at least in the peripheral direction with respect to the axis.

20. The surge arrester as claimed in claim 19, wherein the housing has, except in the area of a shield, an at least approximately uniform wall thickness of between 1 mm and 10 mm.

21. A modularly constructed arrester system constructed of at least two surge arresters as claimed in claim 1, wherein a first one of the at least two electrodes of one of the at least two surge arresters is connected electrically and mechanically to a second one of the at least two electrodes of another surge arrester of the at least two surge arresters.

22. A method of producing a surge arrester, the method comprising:

providing the surge arrester with an active part including at least one diverting element, the active part being constructed at least approximately cylindrically, extending along an axis and having two mutually spaced-apart contacting areas in the direction of the axis;

inserting the active part and two electrodes into a die, the active part and the electrodes being inserted so that a first electrode of the two electrodes rests against one contacting area and a second electrode of the two electrodes rests against another contacting area of the active part;

injecting a material forming a connecting element around the active part and the electrodes;

molding passage openings into the connecting element during sheathing; and shrinking the material for forming the connecting element in the direction of the axis during at least one of cooling and curing in the die, to press the electrodes against the active part.

23. A method of producing a surge arrester, the method comprising:

providing the surge arrester with an active part including at least one diverting element, the active part being constructed at least approximately cylindrically, extending along an axis and having two mutually spaced-apart contacting areas in the direction of the axis;

inserting a material into a die for forming a connecting element for firmly pressing the electrodes against the active part for electrically contacting the active part by means of the electrodes;

inserting the active part and the two electrodes into the die, the active part and the electrodes being inserted so that a first electrode of the two electrodes rests against one contacting area and a second electrode of the two electrodes rests against another contacting area of the active part;

pressing the active part, the electrodes and the material to form the connecting element from the material;

molding passage openings into the connecting element during the pressing; and shrinking the material to form the connecting element in the direction of the axis during at least one of cooling and curing in the die to press the electrodes against the active part.

24. The method as claimed in claim 22, comprising:

pressing elements of the die to form passage openings of the surge arrester, against the active part.

25. The method as claimed in claim 22, wherein the material for forming the connecting element is an almost non-creeping and electrically insulating plastic.

26. The method as claimed in claim 22, comprising:

pressing the two electrodes against the active part by means of sliders constructed so as to be movable in the direction of the axis after the insertion of the electrodes and of the active part into the die.

27. The surge arrester as claimed in claim 1, wherein the at least one diverting element of the active part comprises a varistor.

28. The surge arrester as claimed in claim 27, wherein the varistor is comprised of ZnO.

29. The surge arrester as claimed in claim 9, wherein the connecting element has between 3 and 10 passage openings in the peripheral direction with respect to the axis.

30. The surge arrester as claimed in claim 9, wherein the connecting element has between 3 and 5 passage openings in the peripheral direction with respect to the axis.

31. The surge arrester as claimed in claim 10, wherein the total area of the passage openings is between 30% and 80% of the jacket area of the active part.

32. The surge arrester as claimed in claim 10, wherein the total area of the passage openings is between 40% and 70% of the jacket area of the active part.

33. The surge arrester as claimed in claim 12, wherein the almost non-creeping and electrically insulating plastic contains thermosetting plastic.

34. The surge arrester as claimed in claim 16, wherein the sheet metal has a thickness of 0.5 mm to 4 mm.

35. The surge arrester as claimed in claim 16, wherein the sheet metal has a thickness of 1 mm to 3 mm.

36. The surge arrester as claimed in claim 19, wherein the housing is a weather protection housing.

37. The surge arrester as claimed in claim 20, wherein the approximately uniform wall thickness of the housing is between 1 mm and 6 mm.

38. The surge arrester as claimed in claim 20, wherein the approximately uniform wall thickness of the housing is between 2 mm and 3 mm.

39. The method as claimed in claim 22, wherein the at least one diverting element of the active part comprises a varistor.

40. The method as claimed in claim 39, wherein the varistor is comprised of ZnO.

41. The method as claimed in claim 22, wherein die into which the active part and the two electrodes are inserted comprises an injection molding die.

42. The method as claimed in claim 23, wherein the at least one diverting element of the active part comprises a varistor.

43. The method as claimed in claim 42, wherein the varistor is comprised of ZnO.

44. The method as claimed in claim 23, wherein the die comprises a compression die.

45. The method as claimed in claim 25, wherein the almost non-creeping and electrically insulating plastic contains thermosetting plastic.

* * * * *